(12) United States Patent
Teng et al.

(10) Patent No.: US 6,757,127 B1
(45) Date of Patent: Jun. 29, 2004

(54) ADAPTIVE TEMPERATURE COMPENSATED AC UNLATCH ALGORITHM

(75) Inventors: Jack Ming Teng, Singapore (SG); Kian Keong Ooi, Singapore (SG); Ming Zhong Ding, Singapore (SG); Wing Kong Chiang, Singapore (SG); Louis Seng Hong Pang, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 09/648,869

(22) Filed: Aug. 25, 2000

Related U.S. Application Data
(60) Provisional application No. 60/151,199, filed on Aug. 27, 1999.

(51) Int. Cl.[7] .............................................. G11B 5/596
(52) U.S. Cl. ................................................... 360/77.02
(58) Field of Search ............................... 360/75, 77.02, 360/68; 318/634, 560, 280; 337/379, 89

(56) References Cited

U.S. PATENT DOCUMENTS

| | | | | |
|---|---|---|---|---|
| 4,160,226 A | * | 7/1979 | Taylor ......................... 337/379 |
| 4,348,624 A | * | 9/1982 | Anderson et al. ............ 318/634 |
| 4,507,642 A | * | 3/1985 | Blackburn .................... 337/89 |
| 4,769,806 A | * | 9/1988 | Takamori ..................... 369/292 |
| 5,600,219 A | | 2/1997 | Gomez ......................... 318/456 |
| 5,729,399 A | | 3/1998 | Albrecht et al. ............... 360/75 |
| 5,734,527 A | | 3/1998 | Reinhart ...................... 360/105 |
| 5,768,045 A | | 6/1998 | Patton, III et al. ........ 360/78.04 |
| 5,781,363 A | | 7/1998 | Rowan et al. ............ 360/78.09 |
| 5,870,265 A | | 2/1999 | Boutaghou ................... 360/135 |
| 5,963,393 A | | 10/1999 | Rowan et al. ............ 360/78.06 |
| 5,999,360 A | * | 12/1999 | Meyer et al. ............. 360/77.02 |
| 6,078,455 A | * | 6/2000 | Enarson et al. ................ 360/68 |
| 6,188,191 B1 | * | 2/2001 | Frees et al. .................. 318/560 |
| 6,199,670 B1 | * | 3/2001 | Shirai et al. ................. 188/158 |
| 6,252,364 B1 | * | 6/2001 | Chiang et al. ............... 318/280 |

\* cited by examiner

*Primary Examiner*—David Hudspeth
*Assistant Examiner*—Fred F. Tzeng
(74) *Attorney, Agent, or Firm*—Derek J. Berger

(57) ABSTRACT

An information handling system, such as a disc drive, includes a base, a disc stack rotatably attached to the base, and an actuator assembly movably attached to the base. A region of the disc stack is identified as a parking band, and when power is not provided to the disc drive, the actuator assembly is held in a parked position within the parking band by an actuator latch. The actuator latch and actuator assembly have different resonant frequencies based on several environmental elements near the actuator assembly, including the temperature of the environment in the disc enclosure. The actuator assembly is unlatched by measuring the environmental element near the actuator assembly and applying an alternating current to a voice coil coupled to the actuator. The frequency of the alternating current applied to the actuator assembly during the unlatching procedure is near the resonant frequency of the actuator assembly in the measured environment.

23 Claims, 16 Drawing Sheets

| FREQ. (Hz) | AVE. KICKS | TOTAL KICKS | THERMISTOR READING (IN HEX) |
|---|---|---|---|
| 360 | 6 | 349 | DB – DC |
| 370 | 6 | 301 | DB – DD |
| 381 | 6 | 315 | DB – DC |
| 392 | 6 | 300 | DB – DD |
| 405 | 6 | 339 | DD – DE |
| 418 | 7 | 374 | DB – DE |
| 432 | 8 | 400 | DA – DD |
| 447 | 8 | 442 | DB – DE |
| 463 | 9 | 494 | DB – DD |
| 480 | 9 | 461 | DB – DD |
| 498 | 10 | 500 | DA – DD |
| 518 | 9 | 499 | DB – DD |
| 540 | 9 | 486 | DB – DD |
| 563 | 9 | 466 | DB – DD |
| 589 | 10 | 519 | DD – DE |
| 617 | 9 | 453 | DB – DC |
| 648 | 9 | 480 | DB – DC |
| 682 | 9 | 461 | DB – DD |
| 720 | 11 | 587 | DB – DD |

| 1110 | 1120 | 1130 | 1140 |
|---|---|---|---|
| FREQ. (Hz) | AVE. KICKS | TOTAL KICKS | THERMISTOR READING (IN HEX) |
| 360 | 6 | 300 | DB – DD |
| 370 | 6 | 346 | DB – DD |
| 381 | 5 | 253 | DB – DD |
| 392 | 4 | 240 | DB – DD |
| 405 | 6 | 342 | DB – DD |
| 418 | 7 | 364 | DD – DE |
| 432 | 6 | 343 | DB – DD |
| 447 | 7 | 395 | DB – DD |
| 463 | 8 | 409 | DB – DD |
| 480 | 9 | 491 | DB – DD |
| 498 | 9 | 483 | DB – DD |
| 518 | 8 | 446 | DB – DD |
| 540 | 8 | 441 | DB – DD |
| 563 | 8 | 434 | DB – DD |
| 589 | 9 | 490 | DB – DD |
| 617 | 8 | 405 | DB – DD |
| 648 | 9 | 464 | DB – DD |
| 682 | 8 | 404 | DB – DD |
| 720 | 10 | 505 | DB – DD |

FIG. 12

| FREQ. (Hz) | AVE. KICKS | TOTAL KICKS | THERMISTOR READING (IN HEX) |
|---|---|---|---|
| 360 | 9 | 450 | DB |
| 370 | 11 | 557 | DB |
| 381 | 9 | 487 | DB |
| 392 | 11 | 550 | DA – DB |
| 405 | 10 | 528 | DB |
| 418 | 10 | 500 | DB |
| 432 | 19 | 964 | DB |
| 447 | 11 | 558 | D6 – DB |
| 463 | 15 | 768 | DB |
| 480 | 14 | 737 | DB |
| 498 | 12 | 638 | DB |
| 518 | 12 | 627 | DB |
| 540 | 13 | 650 | DB |
| 563 | 11 | 595 | DB |
| 589 | 11 | 560 | DB |
| 617 | 13 | 687 | DB |
| 648 | 10 | 500 | DB |
| 682 | 10 | 542 | DB |
| 720 | 15 | 761 | DB – DD |

| TEMPERATURE CONDITION | INITIAL FREQUENCY (Hz) (NEXT 8 KICKS) | SECOND FREQUENCY (Hz) (NEXT 8 KICKS) | THIRD FREQUENCY (Hz) (NEXT 8 KICKS) | FINAL FREQUENCY (Hz) (NEXT 8 KICKS) |
|---|---|---|---|---|
| COLD | 381 | 563 | 518 | 480 |
| AMBIENT | 563 | 518 | 480 | 381 |
| CERT TEST | 480 | 518 | 563 | 381 |
| HOT | 518 | 563 | 480 | 381 |

FIG. 15

ADAPTIVE TEMPERATURE COMPENSATED AC UNLATCH ALGORITHM

RELATED APPLICATION

This application claims the benefit of U.S. Provisional Application Serial No. 60/151,199, filed Aug. 27, 1999 under 35 U.S.C. 119(e).

FIELD OF THE INVENTION

This invention relates to the field of mass storage devices. More particularly, this invention relates to unlatching the actuator of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding and decoding data so that it can be successfully written and retrieved from the disc recording surface. A microprocessor controls most of the operations of the disc drive as well as passing the data and commands between a host computer and the disc drive.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") that includes rails and a cavity between the rails. When the disc rotates, air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring that produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage disc after the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided into sectors. The sectors are grouped together on the tracks. In some disc drives, the tracks are a multiplicity of concentric circular tracks. In other disc drives, a continuous spiral is one track. Servo feedback information is used to accurately locate the transducer. The actuator assembly is moved to the required position and held very accurately during a read or write operation using the servo information.

When power to the actuator is not present, it is moved to a safe location on the disc, or "parked." Many times a magnetic latch is employed to hold the actuator in the parked position. When the actuator must be moved from the parked position, current disc drives progressively pump or step-increment current to a voice coil motor (VCM) coupled to the actuator, until the actuator produces a force to break the magnetic force used to latch the actuator. After overcoming the magnetic force, movement of the actuator is monitored closely by the servo controller to prevent the actuator from hitting a crash stop generally positioned at the outer periphery of the disc.

Due mainly to the increasing popularity of portable and notebook computers, there is a trend in the industry towards increased non-operating rotational shock requirements. This in turn requires magnetic latches to have greater capacity. In other words the magnetic latch must apply larger amounts of magnetic force. The prior art approaches to unlatching an actuator require a large amount of current to be provided to the VCM to unlatch the actuator; this method is also known as DC unlatch. The amount of current necessary to employ the DC unlatch method is a primary factor in increasing the size and cost of the power amplifier required to produce such a current. There is a strong desire in the industry to reduce the size and cost of disc drives, rather than increase them. Therefore, the DC unlatch method is unacceptable for disc drives intended to have increased non-operational rotational shock requirements.

Another approach is a method called AC unlatch. In this method, the current to the VCM is applied in an alternating direction so as to produce a resonance frequency equal to that of the magnetic latch system.

Most systems or approaches for unlatching the actuator from the latch do not account differences in operating temperature within the disc enclosure. Most systems or approaches for unlatching an actuator presume that the disc drive operates at a substantially fixed operating temperature. There is a possibility that a disc drive will require a longer time to power up or may not power up at all when the operating temperature within the disc drive changes. Another possible effect is that the disc drive may emit audible noise during the various retries during startup. The difference in operating temperature changes the resonant frequency of the bumper that holds the actuator's latch. For example, in certain disc drives the resonant frequency at a normal operating temperature is approximately 480 Hz. The resonant frequency at a high operating temperature may be approximately 400 Hz, and the resonant frequency at a low operating temperature may be approximately 640 Hz. To release the actuator using resonant frequency, it would be useful to account for the differences in temperature within the disc enclosure and more specifically to account for the differences in resonant frequency of the system given that the actuator will be unlatching at various temperatures.

Therefore, there is a need for a disc drive to account for various operating temperatures during startup. There is also a need for a disc drive to minimize or eliminate the number of retries due to different environmental aspects, such as temperature, within the disc enclosure. And lastly, there is also a need for the drive to unlatch within a minimum amount of time.

SUMMARY OF INVENTION

The invention includes a disc drive having a base and an actuator assembly attached to the base. The motion and position of the actuator assembly are indetermined by a voice coil which is attached to the actuator assembly. A cover is also attached to the base. The cover and the base form a disc enclosure. The invention also includes a temperature measuring device for indicating the temperature within the disc enclosure and outputting a signal indicating the temperature within the disc enclosure. A current driver applies variable frequency current to the voice coil in response to the signal from the temperature measuring device. The current driver may also apply current having a variable magnitude to the voice coil. The temperature measuring device is located within the disc enclosure. The temperature measuring device may be a thermistor. The disc drive may also include a flex cable having one end attached to the actuator assembly and having the other end attached to electronics associated with the disc drive. The temperature measuring device may be attached to the flex cable.

The current driver is adapted to apply at least two different frequencies of alternating current to the voice coil. The current driver is programmed to attempt to unlatch the actuator assembly at least two times. In some embodiments, the current driver is adapted to apply at least two different frequencies of alternating current, to attempt to unlatch the actuator assembly at least two times, and to change the frequency if at least one attempt has been unsuccessful.

Also disclosed is a method for unlatching an actuator assembly in a disc drive, which includes determining an environmental element near the actuator assembly; and applying a frequency of current to the voice coil in response to the environmental element near the actuator assembly. The method may also vary the magnitude of current to the voice coil in response to the environmental element near the actuator assembly. The environmental element may be the temperature of the environment near the actuator assembly. Applying a frequency of current to the voice coil in response to the environmental element may also include categorizing the temperature into one of at least two categories. A first frequency of current may be applied to a first category of temperature and a second frequency of current may be applied to a second category of temperature. The first frequency of current may be near the resonant frequency of the actuator assembly at a first measured temperature and the second frequency of current may be near the resonant frequency of the actuator assembly at a second measured temperature.

Most generally a disc drive system includes an actuator, an actuator latch for holding the actuator in a latched position when engaged with the actuator, and a device for applying variable frequency current to a voice coil attached to an actuator assembly in response to a measured environmental element near the actuator assembly.

Advantageously, the invention reduces the amount of current necessary to unlatch the actuator. The disc drive accounts for various operating temperatures during the unlatch procedure. The invention minimizes the number of retries due to different environmental aspects, such as temperature, within the disc enclosure. There is also a need for a disc drive unlatches in a minimum amount of time.

Advantageously, the invention further decreases the size and cost of the power amplifier required to produce an unlatch current. Additional important features and benefits will become apparent upon a review of the drawings and the corresponding explanation.

BRIEF DESCRIPTION OF THE DRAWINGS

FIG. 11 is a table of the number of kicks needed to unlatch an actuator in a first disc drive at various frequencies and at various thermistor readings categorized as a cold condition.

FIG. 12 is a table of the number of kicks needed to unlatch an actuator in a second disc drive at various frequencies and at various thermistor readings categorized as a cold condition.

FIG. 13 is a table of the number of kicks needed to unlatch an actuator in a third disc drive at various frequencies and at various thermistor readings categorized as a cold condition.

FIG. 15 is a table showing the various frequencies used to unlatch the actuator assembly during various temperature conditions.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
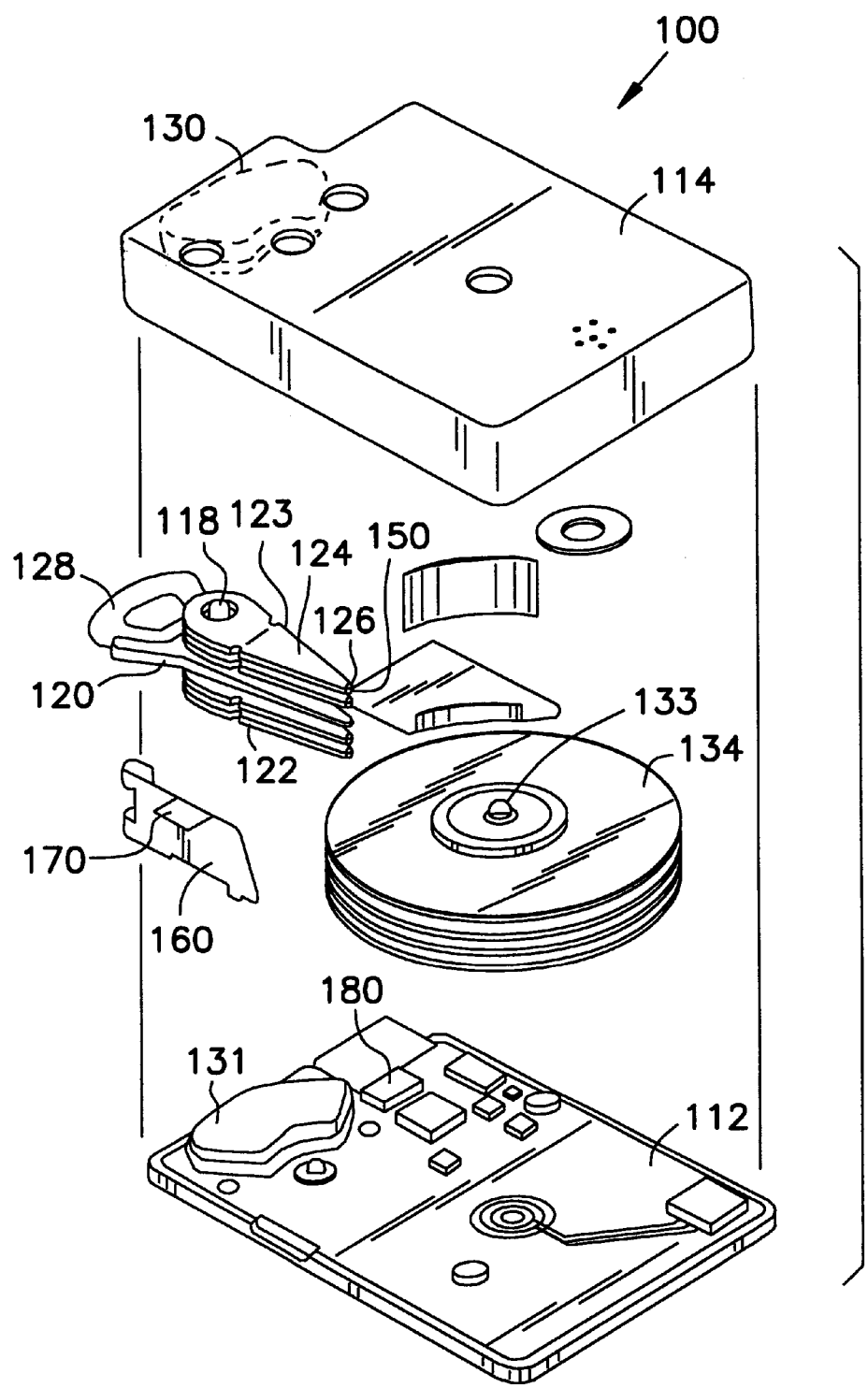
FIG. 1 is an exploded view of a disc drive with a multiple disc stack.

The invention described in this application is useful with all mechanical configurations of disc drives having rotary actuation. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126, which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor, which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub.

Also shown in FIG. 1 is a flex cable 160. Attached to the flex cable 160 is a thermistor 170. The thermistor is attached to a microprocessor 180 which includes a drive current controller. In other words, the microprocessor 180 carries out many control functions including controlling drive current to the voice coil 128. The invention described herein is equally applicable to disc drives which have a plurality of discs as well as disc drives that have a single disc. The invention described herein is also equally applicable to disc drives with spindle motors that are within the hub 133 or under the hub.

Figure 9:
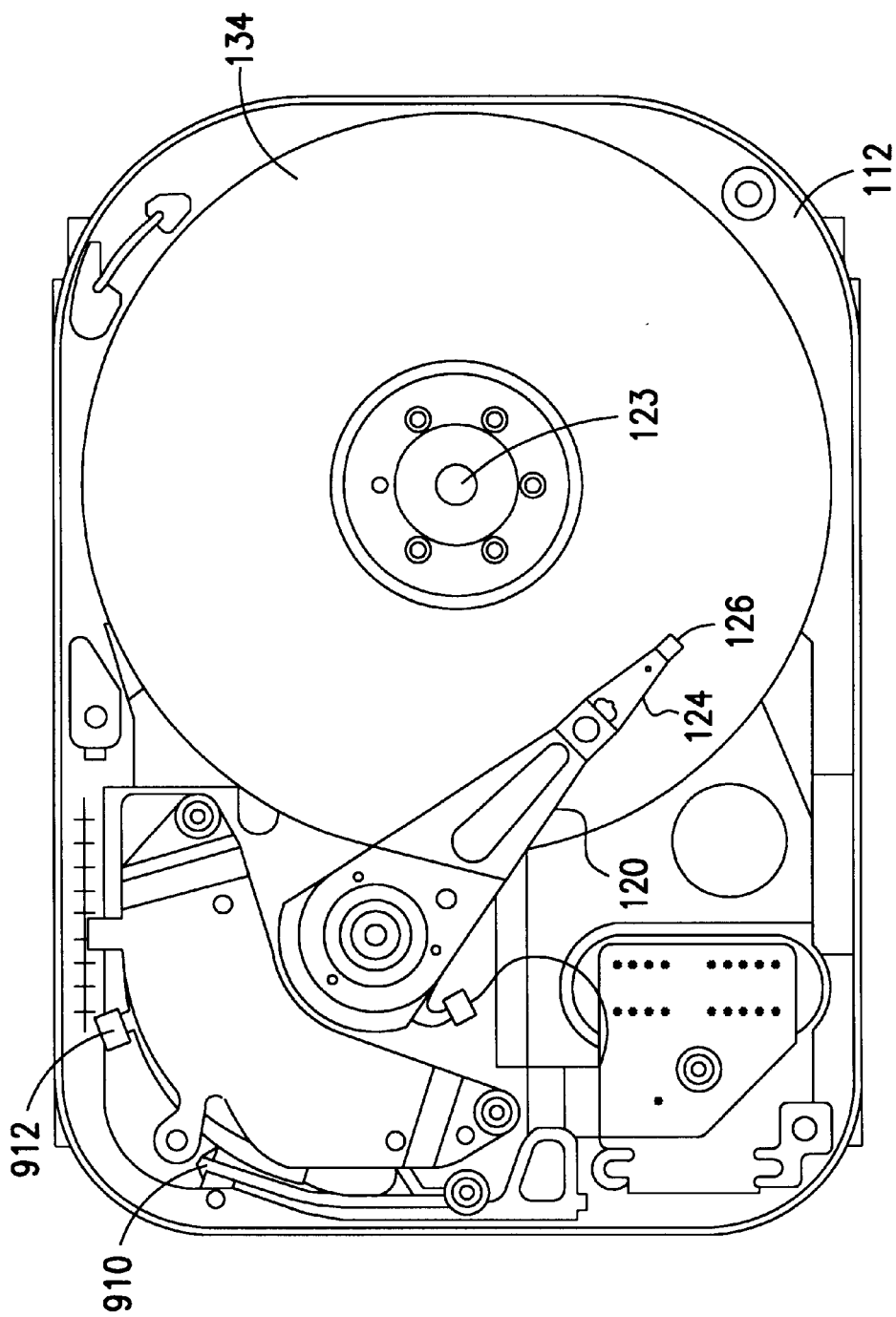
FIG. 9 is a top view of a disc drive with an actuator latch and a bumper for the actuator latch.

FIG. 9 is a top view of a disc drive 100 which more shows an actuator latch 910 which latches the actuator assembly 120 into a parked position. The disc drive 100 also includes a bumper 912 for the actuator latch 910. This top view shows the actuator latch 910 and the bumper 912 more clearly than FIG. 1. Corresponding components are numbered for the convenience of the reader but a description of these components is not repeated here.

Figure 2:
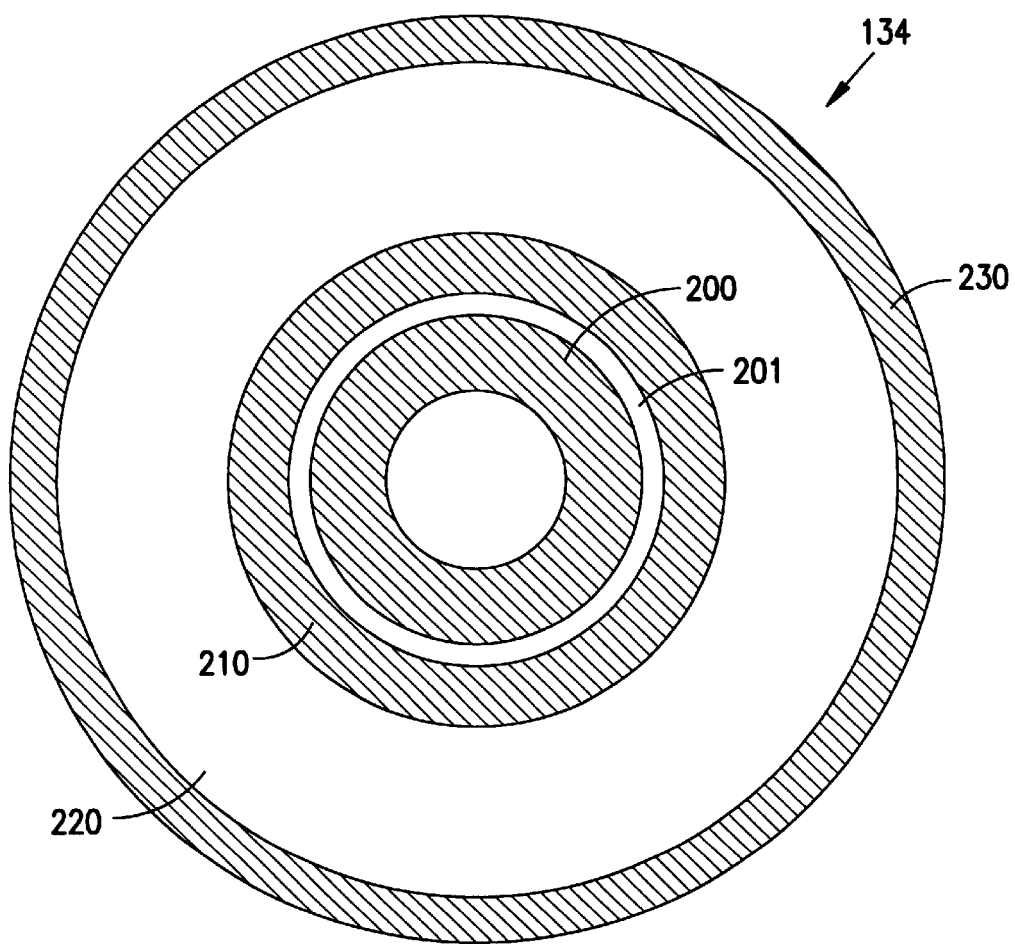
FIG. 2 is a schematic representation of the partitioning of the servo bands of the discs into a plurality of zones.

FIG. 2 indicates schematically the partitioning of the servo bands of the discs into at least two servo zones. The first servo zone is Parking Band Zone 200, which defines the servo zone where the actuator remains in a parked position. The second servo zone is an inner diameter (ID) Guard Band Zone 210, which defines the servo zone in where the actuator is located just after it has become unlatched and left Parking Band Zone 200 in a radially outward direction. Shown, but not required, is a third servo zone, a Parking Boundary Zone 201 is at the outermost end of Parking Band Zone 200. The Parking Boundary Zone 210 may be a servo band or track. As in the prior art, Data Band Zone 220 is the user data area, and an outer diameter (OD) Guard Band Zone 230 defines an area where the actuator is forbidden to prevent the actuator from crashing into the crash stop at the outer diameter.

In the Parking Band Zone 200, the current to the VCM is alternated to simulate the bumper's resonance frequency. Parking Boundary Zone 201 determines whether the actuator has unlatched successfully, as the actuator is not at that location unless it has left Parking Band Zone 200.

Once the actuator is unlatched and passed Parking Boundary Zone 201, it is within ID Guard Band Zone 210. The force required to overcome the magnetic latch can be quite large; because the force required is directly proportional to the acceleration of the actuator, the actuator might move too rapidly towards the outer regions of the disc, which could damage the recording head carried by the actuator. Therefore, in ID Guard Band Zone 210, the grey code (or signal coming from the servo system) is monitored closely. Grey code is part of the servo field information written to the disc, which yields positional information within any zone. A decelerating current is applied to the VCM to slow down the actuator if the position information indicates that the actuator 120 is moving too fast or has been over accelerated. Over acceleration indicates that the force used to unlatch the magnetic latch was too high. If the force is too low, an accelerating current is applied to increase the speed of the actuator. This process is repeated until the actuator leaves ID Guard Band Zone 210.

Once the actuator leaves ID Guard Band Zone 210 and enters Data Band Zone 220, no current is applied to the VCM based on the amount of force used to unlatch the magnetic latch. Conventional interrupt-driven servo commands are applied. In other words, a starting track and target track are determined and velocity profile are followed for long seeks within the data band zone 220. Of course for short seeks or track switches, no velocity profile may be needed.

In a first preferred embodiment, a set of M, where M has a value of at least two, different frequencies are applied to the VCM during the attempt to unlatch the actuator while the actuator 120 is positioned at the Parking Boundary Zone 201. A total of N, where N is at least 2 and is greater than or equal to M, attempts are made. If at least R, where R is at least 1 and less than or equal to N, attempts have been unsuccessful, the frequency applied to the actuator is changed to the frequency corresponding to a different value of M. In the most preferred embodiment, M has the value of four, N has the value of 32, and R has the value of (M/N)=8. This embodiment overcomes problems associated with variability in the required unlatch current frequency. One cause of such variable current frequency requirements is the dependence on operating and ambient temperatures of the unlatch current frequency.

In a second preferred embodiment, a variable initial current magnitude is applied during each subsequent attempt to unlatch the actuator after a first unsuccessful attempt. This embodiment overcomes problems associated with the variety of magnetic forces required to unlatch actuators of differing design.

The first and second preferred embodiments may each be practiced alone. In another preferred embodiment, they are practiced together. In this preferred embodiment, the invention is implemented in the form of an algorithm comprising one main routine having four states, each of which is implemented in a separate subroutine. The main routine describes the main flow and checking of conditions to determine to which state or subroutine the algorithm branches. The four states describe the necessary steps taken to ensure that the unlatch procedure is accomplished.

Figure 3:
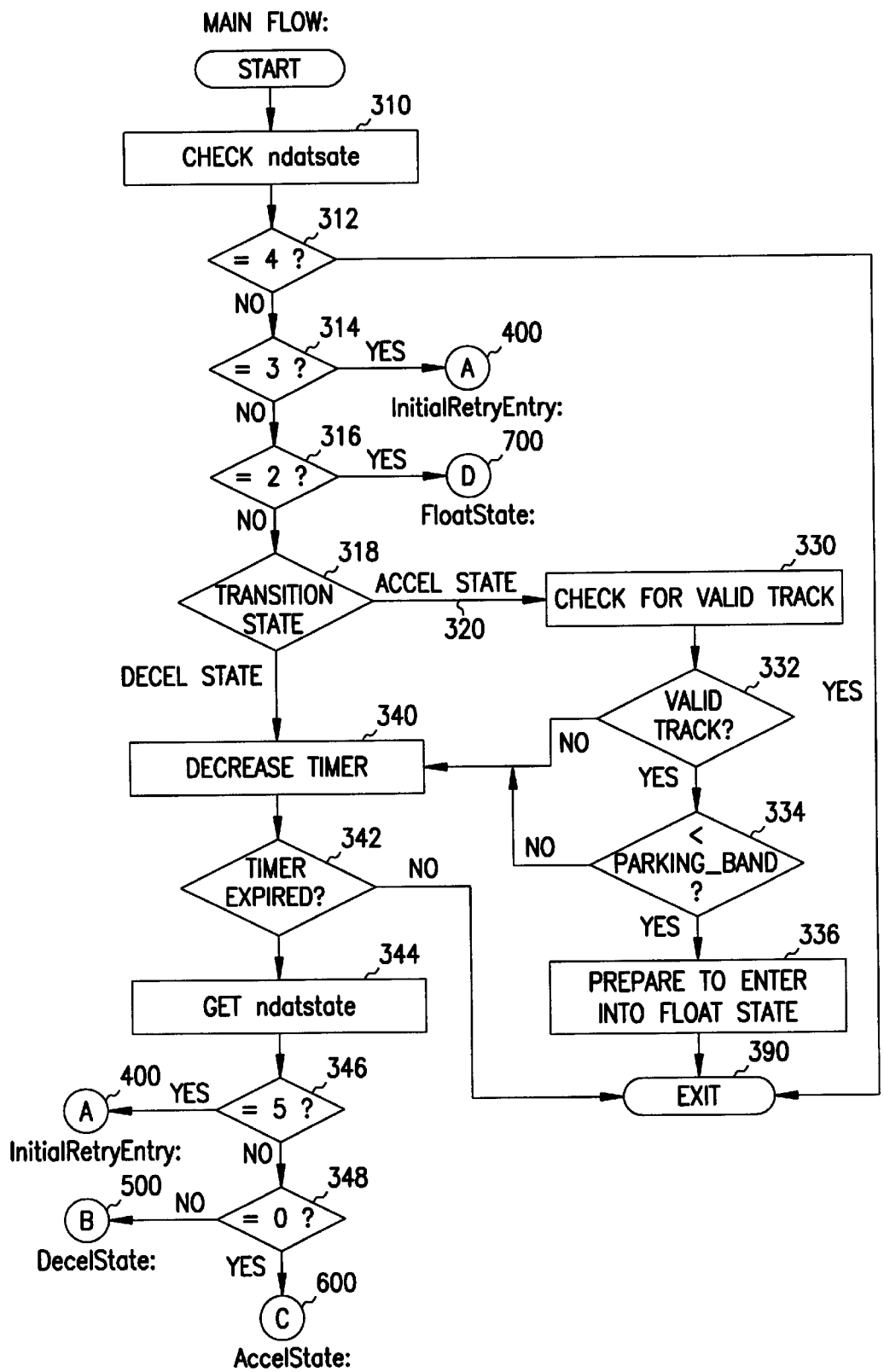
FIG. 3 is a flowchart of the preferred embodiment of the algorithm of the invention.

FIG. 3 shows the main Actunlatch routine. During power up, a variable ndatstate is initialized with a value (0, 1, 2, 3, 4 or 5) so that the algorithm initializes the AC unlatch variables when it enters the Actunlatch routine for the first time. The algorithm evaluates the value of ndatstate, as depicted by reference number 310, to determine the appropriate state to take. Table 1 describes the value of ndatstate with the corresponding state and its immediate action.

TABLE 1

| Ndatstate | State | Action Taken |
|---|---|---|
| 0 | AccelState | Wait for timer to expire before jump |
| 1 | DecelState | Wait for timer to expire before jump |
| 2 | FloatState | Immediate jump |
| 3 | InitialRetryLatch | Immediate jump |
| 4 | Finished Unlatch | Exit unlatch routine |
| 5 | InitialRetryEntry (on unlatch retry) | Immediate jump |

In AccelState where the algorithm is waiting for timer to expire, a check is made to see whether the current servo track has left a particular servo track defined in Parking Band Zone 200 and known as PARKING_BAND. If this condition is met, the algorithm starts to prepare to enter into FloatState, otherwise the algorithm just waits for the timer to expire. In DecelState, this checking is not required.

Checking the ndastate state is initially done through a series of decision boxes 312, 314 and 316. In decision box 312, it is determined whether or not the ndastate equals 4. If the ndastate equals 4, the unlatch operation is finished and the unlatch routine is exited as depicted by exit box 390. If the ndastate does not equal 4, the next decision 314 is encountered. If the ndastate equals 3, then an initial retry is started and the process jumps to the initial retry entry subroutine which is further detailed in FIG. 4. If the ndastate does not equal 3, then the next decision box 316 is encountered to determine whether or not the ndastate equals 2. If the ndastate equals 2, the action taken is an immediate jump to the FloatState subroutine depicted by FIG. 7. In the FloatState, appropriate current will be supplied to the voice coil motor to ensure the actuator is moving towards the data band zone.

The next decision tree is to determine whether the actuator arm 120 and the transducer attached thereto 150 is in a transition state, as depicted by reference number 318. If the transition state is an acceleration state, as depicted by arrow 320, a check for a valid track is conducted, as depicted by reference number 330. A decision box regarding a valid track, as depicted by reference numeral 332, determines whether the track is actually valid. If the track is valid, it is determined whether or not the track is less than the PARKING_BAND. If the track number is less than the number associated with the PARKING_BAND, this indicates that the slider and transducer 150 has left the Parking Band zone and entered into ID Guardband zone and the actuator arm 120 prepares to enter into the FloatState, as depicted by reference number 336. If the valid track number is not less than the PARKING_BAND, then the timer is decreased, as depicted by reference number 340. Also, if the track is not considered a valid track at decision box 332, the timer is also decreased, as depicted by reference number 340. The next step is to determine if the timer has expired, as depicted by reference number 342. If the timer has expired, then the ndastate is again obtained, as depicted by reference number 344. If the ndastate is equal to 5, an immediate jump is taken to the initial retry entry which is further described in FIG. 4. If the decision box 346 does not indicate that the ndastate is equal to 5, then the next decision box 348 is encountered in which the ndastate is determined if it equals 0. If it is not equal to 0, then the subroutine for a DecelState, which is described in FIG. 5, is the next subroutine. If the ndastate is equal to 0, then the next subroutine encountered is for the AccelState is run. The AccelState is further described in FIG. 6.

Figure 4:
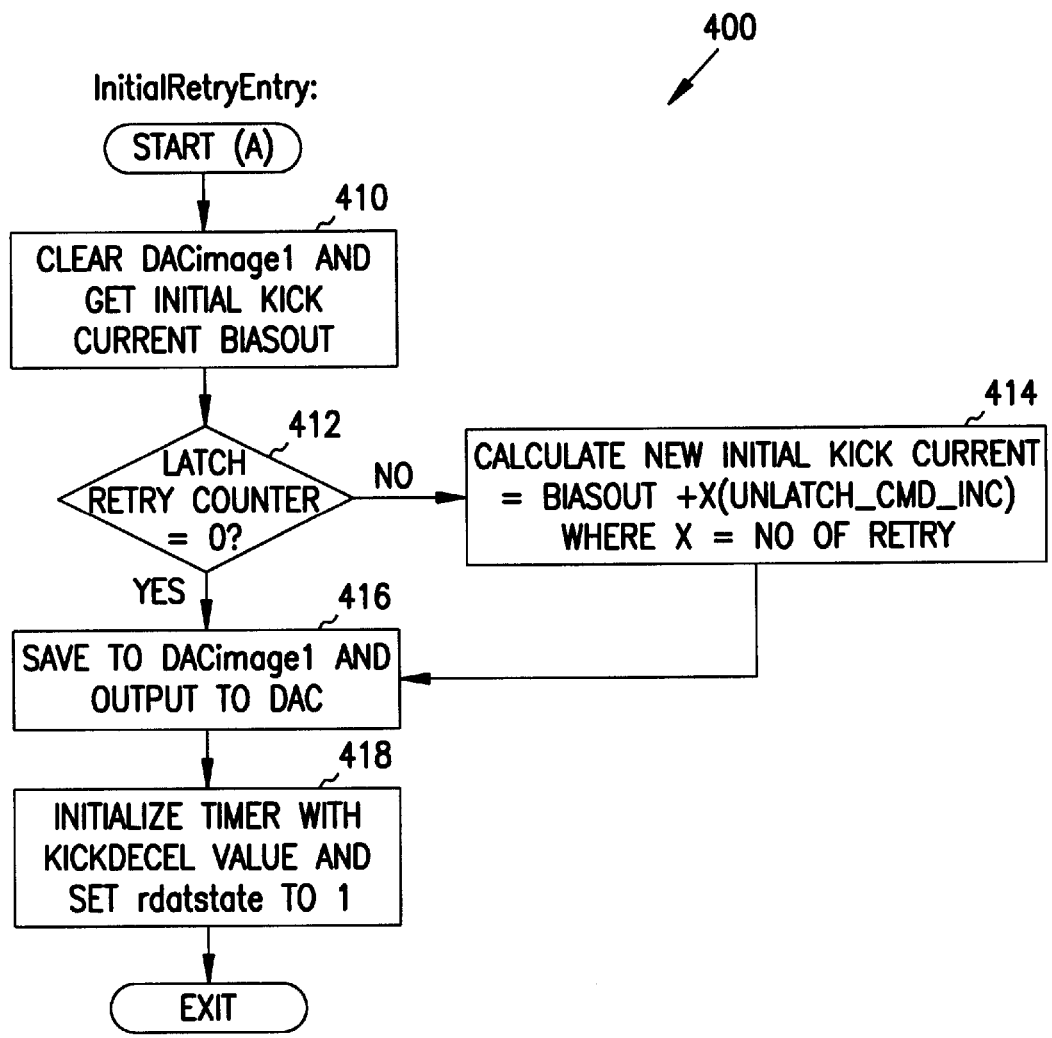
FIG. 4 is a flowchart of the Initial Retry Entry subroutine of the invention.
Figure 5:
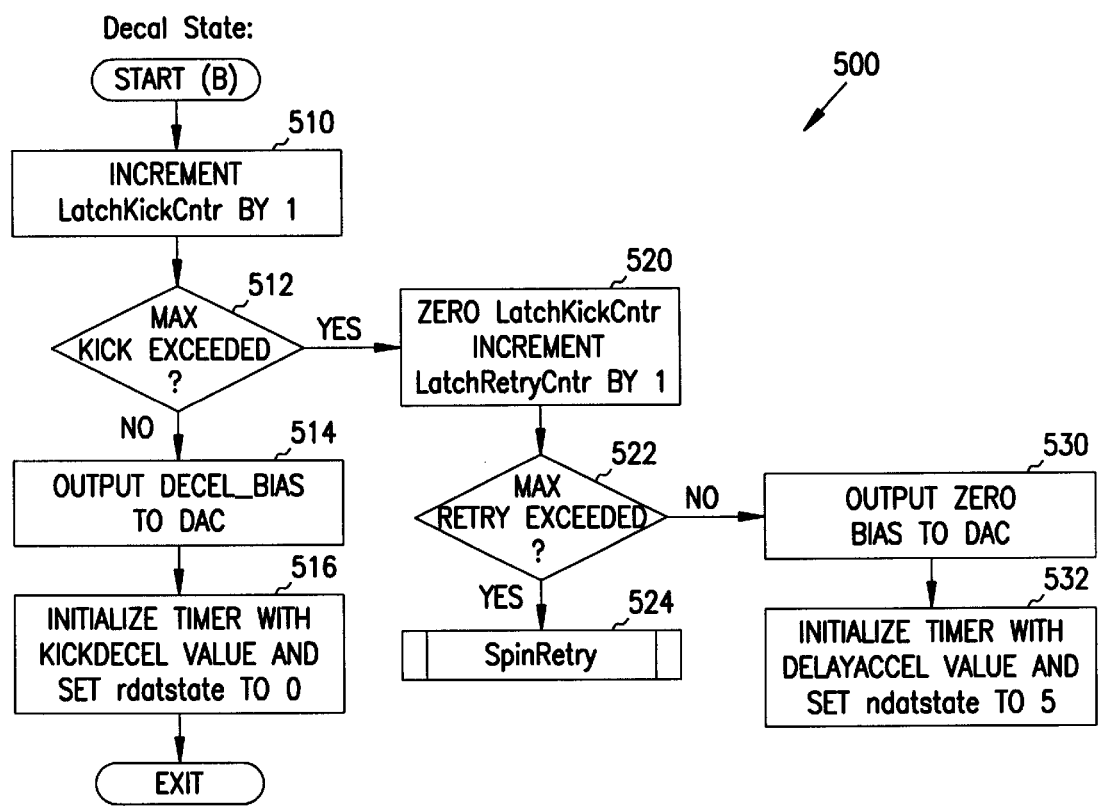
FIG. 5 is a flowchart of the Decel State subroutine of the invention.

FIG. 4 shows the InitialRetryEntry subroutine. As a general overview, in this state, an initial "kick current," BIASOUT is programmed into the DAC and stored in variable DACImage1. Also, a timer with a value of KICKDECEL is set. A value of 1 is programmed to ndatstate so that when the timer expires, the algorithm jumps to DecelState. In subsequent unlatch retries, an incremental value of UNLATCH_CMD_INC is added with BIASOUT as the initial kick current. The incremental value which is added to BIASOUT depends on the number of unlatch retries and a variable stored in LatchRetryCntr.

The first step in the initialretry subroutine 400 is to clear the DAC image IMAGE1 and get an initial kick current, BIASOUT, as depicted by reference numeral 410. After obtaining the initial kick current, a decision box 412 determines whether the latch retry counter equals 0. If the latch retry counter does not equal 0, a new initial kick current is calculated as depicted by reference numeral 414. If the latch retry counter does equal 0, the value is saved to DACImage1 and output to the digital to analog converter, as depicted by step 416 in FIG. 4. The next step is to initialize the timer with the KICKDECEL value and to set ndatstate to 1, as depicted by reference numeral 418. The next step is to exit the subroutine.

FIG. 5 shows the DecelState subroutine. The number of kicks, stored in a variable LatchKickCntr, is incremented by 1 and compared to the maximum kick value, DELAY_SAMPLE. If it is less than the maximum value, a kick current DECEL_BIAS is programmed to the DAC and a timer with a value of KICKDECEL is set. A value of 0 is programmed to ndatstate so that when the timer expires, the algorithm jumps to AccelState. If the value exceeds the maximum value, LatchKickCntr is reinitialized back to zero; also, LatchRetryCntr is incremented by 1 and this counter is checked to determine whether it has reached the maximum unlatch retries permitted. If it has, a spinup retry is called, and if it has not, a zero current is programmed to DAC and a timer with a value of DELAYACCEL is set. A value of 5 is programmed to ndatstate so that when the timer expires, the algorithm jumps to InitialRetryEntry.

With the above overview in mind, the specifics of the subroutine as shown in FIG. 5 will now be discussed. As shown by reference numeral 510, the first step is to increment the LatchKickCntr by 1, as depicted by reference numeral 510. The next step is to determine if the max kick has been exceeded, as depicted by decision box 512. If the max kick has not been exceeded and DECEL_BIAS is output to the digital to analog converter, as depicted by reference numeral 514. The next step is to initialize the timer with a KICKDECEL value and set the ndastate to 0, as depicted by reference numeral 516. Setting the ndastate to 0 makes the algorithm jump to the AccelState when the timer expires. If the max kick is exceeded, the LatchKickCntr is programmed to zero and the LatchRetryCntr is incremented by 1, as depicted by reference numeral 520. The next step is to determine if the maximum retry number has been exceeded, as depicted by decision box 522. If it has, then a spin retry is attempted, as depicted by reference numeral 524, before exiting the subroutine. If the maximum retry has not been exceeded, then the output 0 bias is placed on the digital to analog converter, as depicted by reference numeral 530. The next step then is to initialize the timer with a DELAYACCEL value and set the ndastate to 5, as depicted by reference numeral 532 and exit the subroutine.

Figure 6:
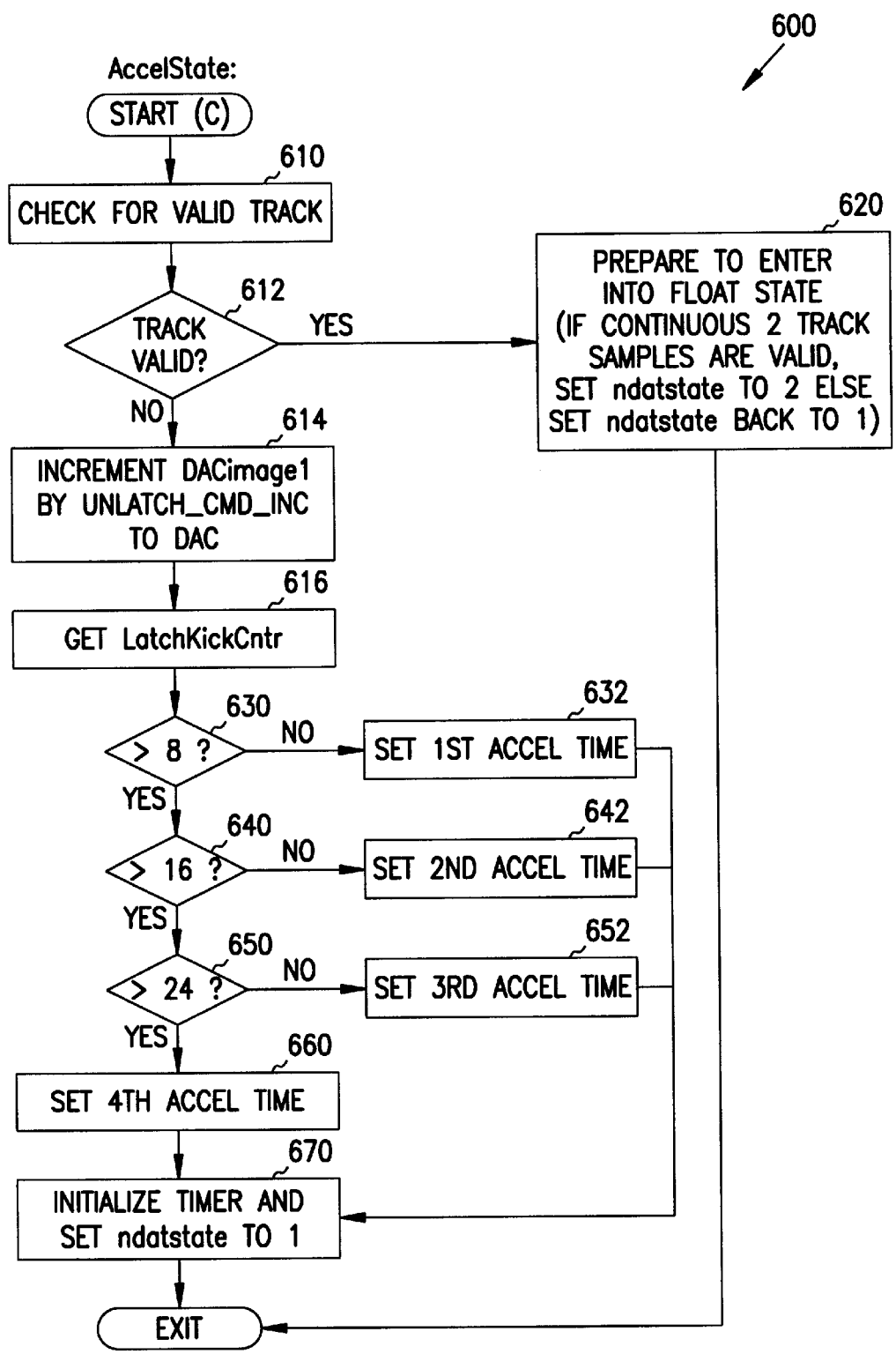
FIG. 6 is a flowchart of the Accel State subroutine of the invention.

FIG. 6 shows the AccelState subroutine 600. The current track is checked to see whether the actuator has left the PARKING_BAND. If this condition is met, the algorithm starts to prepare to go into FloatState, otherwise a kick current is programmed into the DAC and a timer is set. This kick current uses the data stored in DACImage1 and is incremented by UNLATCH_CMD_INC every time the algorithm enters this state. The timer value is dependent on the LatchKickCntr because the value programmed simulates the four different frequencies. A value of 1 is programmed into ndatstate so that when the timer expires, the algorithm jumps to DecelState.

Now turning to FIG. 6 to further detail the AccelState subroutine 600, the first step is to check for a valid track, as depicted by reference numeral 610. The decision box 612 determines whether there is a valid track outside of the PARKING_BAND 200, as depicted by decision box 612. If the track is valid, the actuator arm is prepared to enter into the FloatState if two continuous track samples are valid, as depicted by reference numeral 620. If two continuous track samples are valid, the ndastate is set to 2 and if not, the ndastate is set to 1. As you will recall, the ndastate of 2 relates to the FloatState and the ndastate of 1 corresponds to the DecelState. After step 620, the AccelState subroutine is exited. If the track is not valid, the DACImage1 is incremented by the UNLATCH_CMD_INC to the digital to analog converter, as depicted by step 614 in FIG. 6. The next step is to get the LatchKickCntr value, as depicted by reference number 616. If the LatchKickCntr value is greater than 8, as depicted by decision box 630, then it drops to another decision box 640 to determine if the LatchKickCntr value is greater than 16. If the LatchKickCntr is greater than 16, another decision box 650 is encountered to determine if the LatchKickCntr value is greater than 24. If the LatchKickCntr is greater than 24, a fourth acceleration time is set, as depicted by reference numeral 660. Then the timer is initialized and an ndastate of 1 is set. A value of 1 is programmed into the ndastate so that when the timer expires, the algorithm jumps to the DecelState. If the LatchKickCntr is not greater than 8 at decision box 630, a first acceleration time is set, as depicted by reference numeral 632. Similarly, if the LatchKickCntr is not greater than 16 at decision box 640, then a second acceleration time is set, as depicted by reference numeral 642. Finally, if the LatchKickCntr is not greater than 24 at decision box 650, a third acceleration time is set, as depicted by reference numeral 652. After setting either the first acceleration time, 632, the second acceleration time, 642, the third acceleration time, 652, or the fourth acceleration time, 660, the timer is then initialized and the ndastate is set to 1 so that the algorithm jumps to the DecelState after the timer expires.

Figure 7:
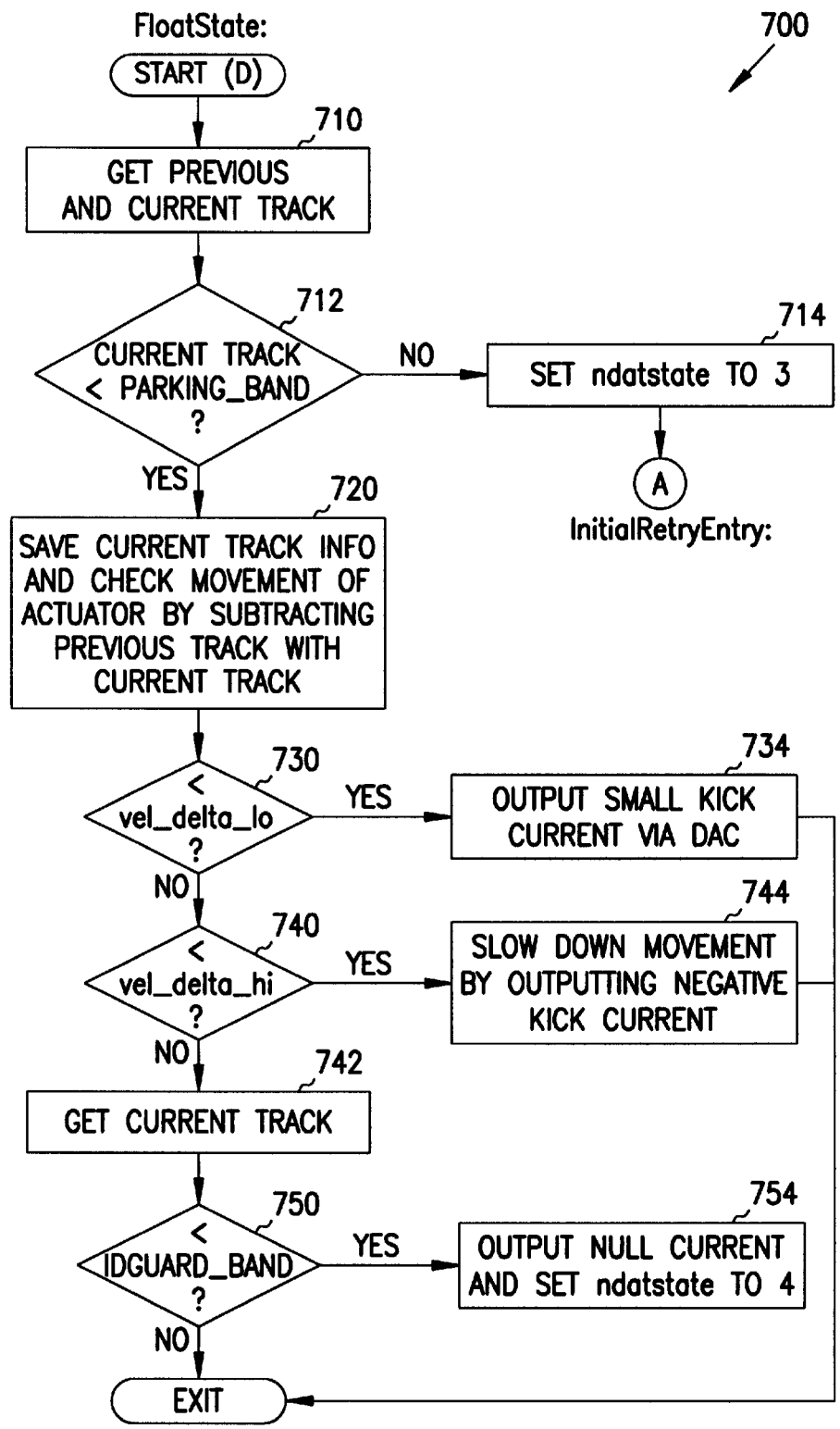
FIG. 7 is a flowchart of the Float State subroutine of the invention.

FIG. 7 shows the FloatState subroutine 700. The current track is checked to see whether the actuator has left the PARKING_BAND. If this condition is not met, the algorithm restarts the unlatch routine all over again by jumping to InitialRetryState, otherwise the actuator acceleration is checked and appropriate current is programmed into the DAC so that the actuator can move toward the outer perimeter of the disc within the speed limit. The actuator acceleration is determined by comparing the values corresponding to the locations of the current and previous servo tracks. If the difference in values is too large (i.e., actuator movement is too fast), a deceleration current is programmed into the DAC to slow down the actuator. If not, a very small kick current is programmed into the DAC. The current track is also queried to check whether the actuator has left IDGUARD_BAND, which is a specific servo track in ID Guard Band Zone 210. If this condition is met, a value of 4 is programmed into ndatstate to indicate successful unlatching of the actuator, and thus the end of the unlatch algorithm. If not, a value of 2 is programmed into ndatstate so that the unlatching process is terminated and the next interrupt produces a jump to FloatState.

Again, looking at FIG. 7, the FloatState subroutine 700 will be further described. The first step in the FloatState subroutine is to get the previous and current tracks, as depicted by reference numeral 710. The next step, as depicted by decision box 712, is to determine if the current track is lesser than the track number associated with the PARKING_BAND. If the current track number is lesser than a track number associated with the PARKING_BAND, the current track info is saved and the movement of the actuator is checked by subtracting the previous track information and the current track information, as depicted by reference numeral 720. The velocity $\delta$ is determined. Then the velocity $\delta$ is determined whether or not it is low, as depicted by decision box 730. If the velocity $\delta$ is low, a small kick current is output via the DAC to the actuator arm, as depicted by reference numeral 734. If the velocity $\delta$ is not low, a decision box determines whether or not the velocity $\delta$ is high, as depicted by reference numeral 740. If the velocity $\delta$ is less than the high, then slow movement is achieved by outputting negative kick current, as depicted by reference numeral 744 to the actuator arm. If the velocity $\delta$ is not less than the high value, the current track is obtained, as depicted by reference numeral 742. The next step is to determine if the track number obtained in step 742 is less than the tracks associated with the ID guard band, as depicted by decision box 750. If the track number obtained is less than the track number associated with the IDGUARD_BAND, a null current is output to the arm and the ndastate is set to 4. When the ndastate is set to 4, the unlatch is considered finished and you exit the main unlatch subroutine.

Figure 8:
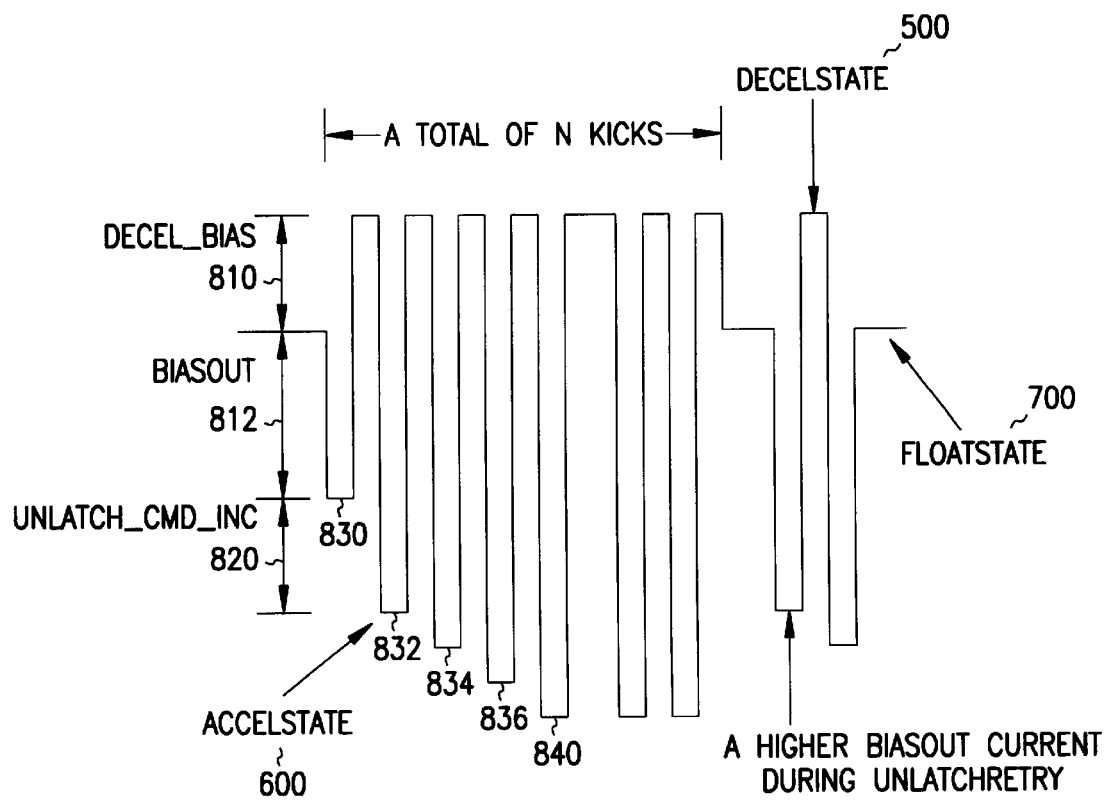
FIG. 8 is a schematic representation of the overall process of the invention.

FIG. 8 is a schematic representation of the sequence of the overall AC unlatch routine. FIG. 8 is a diagram of the alternating current unlatch routine which includes a retry. Initially, there is a deceleration bias 810 and a BIASOUT 812. Also, there is an UNLATCH_CMD_INC 820. The actuator arm is kicked using an alternating current and during the acceleration state 600, each of a total n kicks are attempted. The UNLATCH_CMD-INC is used to add on to the amount of BIASOUT during the acceleration state. For example, the first kick 830 differs from the second kick 832 by the amount of the UNLATCH_CMD_INC 820. The increment is added on to each of the subsequent kicks 834 and 836 to produce even higher BIASOUT values. The UNLATCH-CMD-INC is added to a selected number of the kicks or current outputs to the actuator voice coil motor. If it is determined that the number of kicks were unsuccessful, a higher initial BIASOUT current is used during an unlatch retry. After the initial BIASOUT current is set, an UNLATCH_CMD_INC 820 is added on subsequent kicks until the actuator becomes unlatched. At that point, the actuator undergoes a FloatState 700 until the actuator comes under control and enters onto or over data band zone 210.

Advantageously, the invention reduces the amount of current necessary to unlatch the actuator. The disc drive accounts for various operating temperatures during the unlatch procedure. The invention minimizes the number of retries due to different environmental aspects, such as temperature, within the disc enclosure. There is also a need for a disc drive unlatches in a minimum amount of time. Advantageously, the invention further decreases the size and cost of the power amplifier required to produce an unlatch current.

Figure 10:
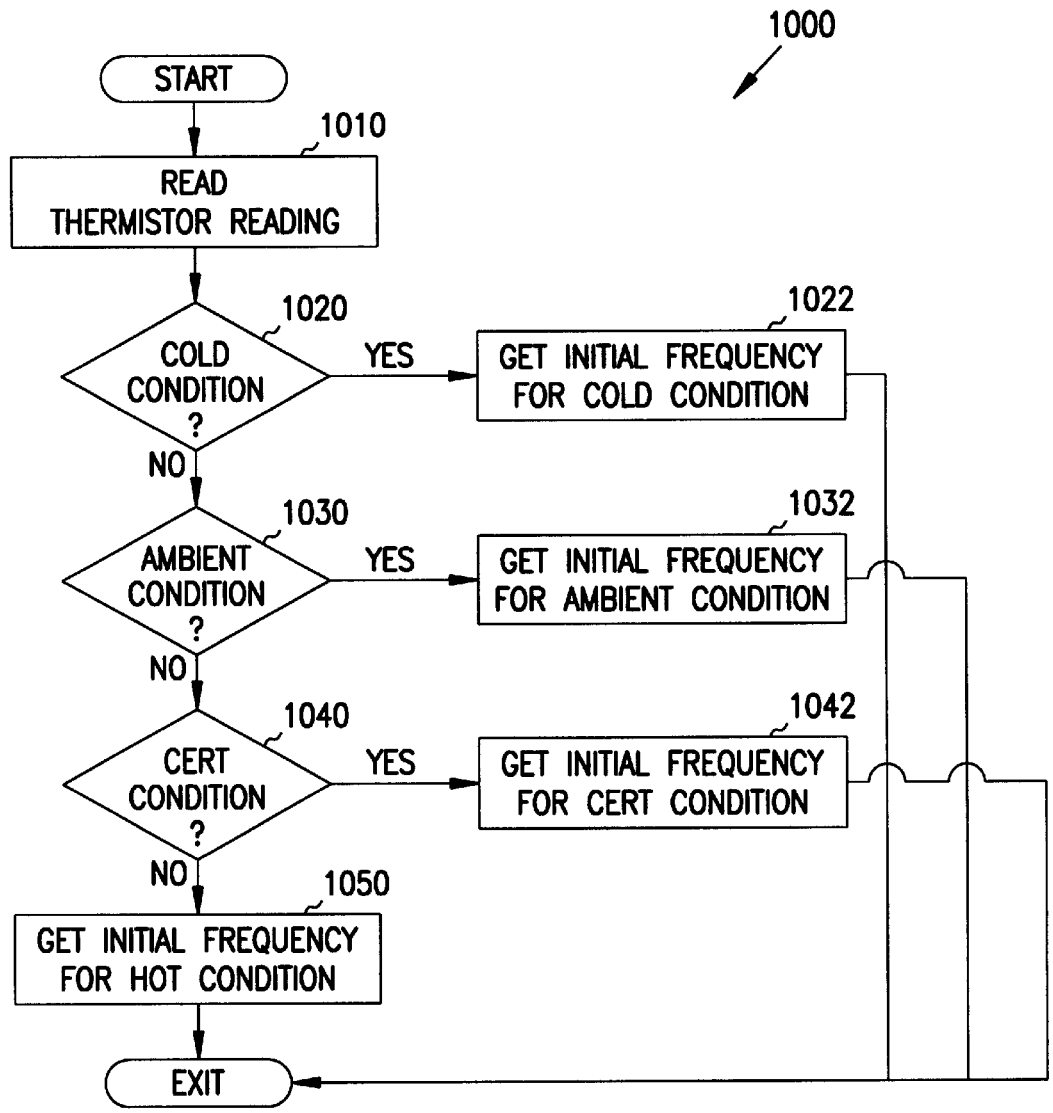
FIG. 10 is a flowchart of the operation of an unlatching procedure in which an alternating current of a selected frequency is applied to an actuator assembly based on a measured environmental condition such as operating temperature.
Figure 14:
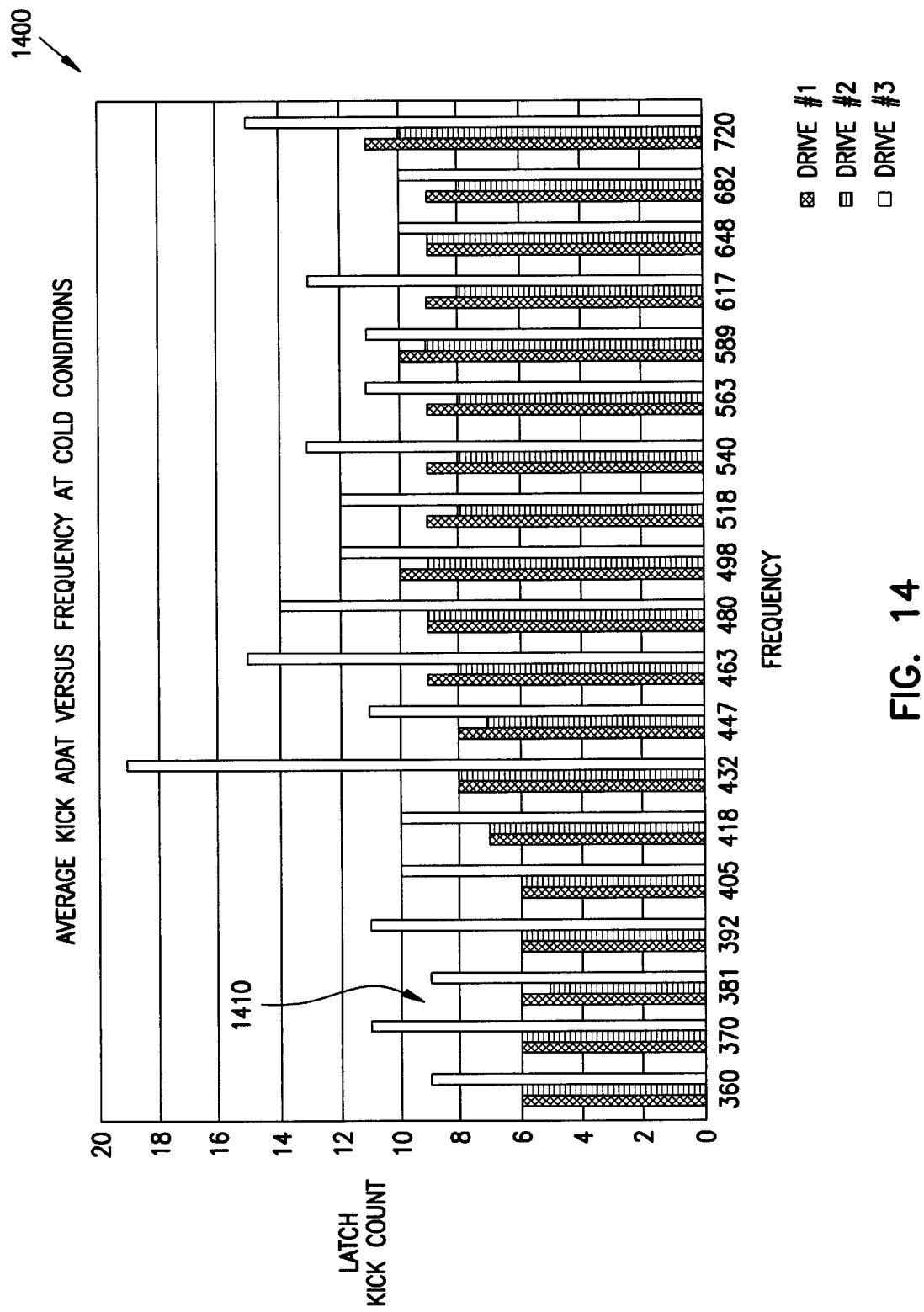
FIG. 14 is a histogram plotting the latch kick count for the various disc drives at various frequencies of current for the cold condition.

FIG. 10 is a flowchart 1000 of the operation of an unlatching procedure in which an alternating current of a selected frequency is applied to an actuator assembly based on a measured environmental condition such as the operating temperature.

The initial step is to read the thermistor reading 1010. From this initial thermistor reading, the temperature can be determined and can be categorized into one of four different conditions namely, a cold condition 1020 an ambient condition 1030, a process certified test condition (CERT) 1040 or a hot condition 1050. Initially, a thermistor 170 count is read and the output of the thermistor 170 is input to the controller 180. The thermistor 170 count value corresponds to a temperature reading. Given this temperature reading or thermistor 170 count, the initial frequency to use during start-up is determined based on the temperature. As shown in FIG. 1, the thermistor 170 is mounted on the flex cable 160 which is located inside the head disc enclosure which is formed when the cover 114 is attached to the base 112 of the disc drive 100. In one preferred embodiment, the operating temperature is divided into one of four regions 1020, 1030, 1040 and 1050. The region associated with a cold condition 1020 corresponds to temperatures from 0° C. to 20° C. while an ambient condition 1030 corresponds to 20° C. to 40° C., while a CERT condition 1040 corresponds to a temperature of 40° C. to 50° C. and a hot condition 1050 corresponds to temperatures greater than 50° C. It should be noted, however, that more conditions can be set forth using this start-up method and that the temperature ranges can be adjusted to the various conditions set forth by a designer. The relationship between a thermistor and the temperature is needed. As mentioned previously, a thermistor 170 is mounted to the flex circuit or flex cable 160 inside the head disc enclosure. The thermistor 170 has an output pin which is connected to an analog-to-digital converter (not shown). The analog to digital converter then sends digital data to the microprocessor or controller 180 for use as part of the input for the unlatch routine 1000. The relationship between the thermistor 170 and the temperature can be approximated by the following equation:

Thermistor value=−1.963*the temperature (° C.)+220.39583

From the above equation, it can be deduced that the thermistor 170 value decreases with temperature.

Now going back to the flowchart 1000, the initial step is to read the thermistor 170 reading, as depicted by step 1010. The next step is to determine if the condition encountered is a cold condition, as depicted by step 1020. If it is a cold condition 1020, the initial frequency for cold condition is obtained, as depicted by reference numeral 1022. If it is not a cold condition 1020, the thermistor value is compared with thermistor values associated with an ambient condition, as depicted by step 1030. If the temperature is in the range of the ambient condition, the initial frequency for the ambient condition is obtained, as depicted by reference numeral 1032. If it is not a temperature associated with an ambient condition, then the next step is to determine whether or not the thermistor value corresponds to the CERT condition, as depicted by reference numeral 1040. If the thermistor value does correspond to the CERT condition, then the initial frequency for the CERT condition is obtained, as depicted by step 1042. If it is not a CERT condition, then by the process of elimination, the thermistor value is associated with a hot condition, as depicted by step 1050 and the initial frequency for a hot condition is obtained. Of course, depending upon the frequency obtained, the current controller sends the appropriate initial frequency to the voice coil 128 of the actuator assembly 120 to unlatch the inertial latch from the actuator assembly 120.

In order to determine the appropriate starting frequency for a model of disc drive, several of the same model of disc drives are tested. As shown in this particular example by FIGS. 11, 12 and 13, a first drive, a second drive and a second disc drive are tested for thermistor values in the range of the cold condition. The results are shown in the tables shown in FIGS. 11, 12 and 13. FIG. 11 will be described in detail and the description of FIGS. 12 and 13 will be skipped, since they would be repetitive. FIG. 11 is a table that includes four rows of information related to the frequency of the current 1110, the average number of kicks 1120, the total number of kicks 1130 and the thermistor reading 1140. The thermistor reading 1140 is used to initially categorize what condition the particular drive is in. For a given thermistor reading, the controller sends pulses of current at a particular frequency to the voice coil 128. The total number of kicks 1130 are divided by the number of times the actuator latch is unlatched at the particular frequency to yield the average number of "kicks" or current pulses that are required to unlatch the actuator latch 910 from the inertial latch 912. This process is repeated for a first drive for various selected frequencies. The process is repeated for a second drive as shown by the results in FIG. 12 and also for a third disc drive, as shown by the results in FIG. 13. For each of the drives, the same test is run and a similar table is produced. A histogram 1400 is then plotted. The average kick count or number of current pulses needed to free the actuator assembly 120 from the latch 910 is plotted for each of the three disc drives at the various frequencies. In other words, the tables of FIGS. 11, 12 and 13 are plotted in a histogram having the frequency on the X axis and the average latch kick count on the Y axis, for each of the three drives. From this histogram 1400, it can be determined which frequencies, for a given temperature or environmental condition, are the most efficient at unlatching the actuator assembly 120. For example, the frequency of 381 hertz is most efficient in the cold condition shown since the histogram shows that it requires the least number of kicks or bursts of current at the particular frequency in order to unlatch the actuator assembly.

A second frequency and a third frequency as well as a final frequency are also selected. In this design, a good initial frequency for each temperature condition is selected, therefore there are 4 different frequencies. Then from these 4 frequencies, the best frequency for the initial frequency is selected followed by a second frequency, a third frequency, and a fourth frequency. Another way to do it is to choose 4 sets of frequencies based on each temperature condition, however, the temperature can be ramp up or down and the bumper's natural frequency can change during the temperature ramping. This particular process is repeated for each of the conditions, cold, ambient, CERT test and hot and placed in a table as shown in FIG. 15. Rather than repeat the procedure and show you a set of tables such as is shown in FIGS. 11–13 for each of the conditions as well as another histogram for each of the conditions, the same testing takes place to determine the initial frequency, a second frequency, a third frequency and final frequency for each of the conditions. It should also be noted that although this particular invention is geared toward temperature, there may be other environmental factors within the disc enclosure that are measured and, therefore, temperature is not the only environmental factor contemplated by this invention.

Figure 16:
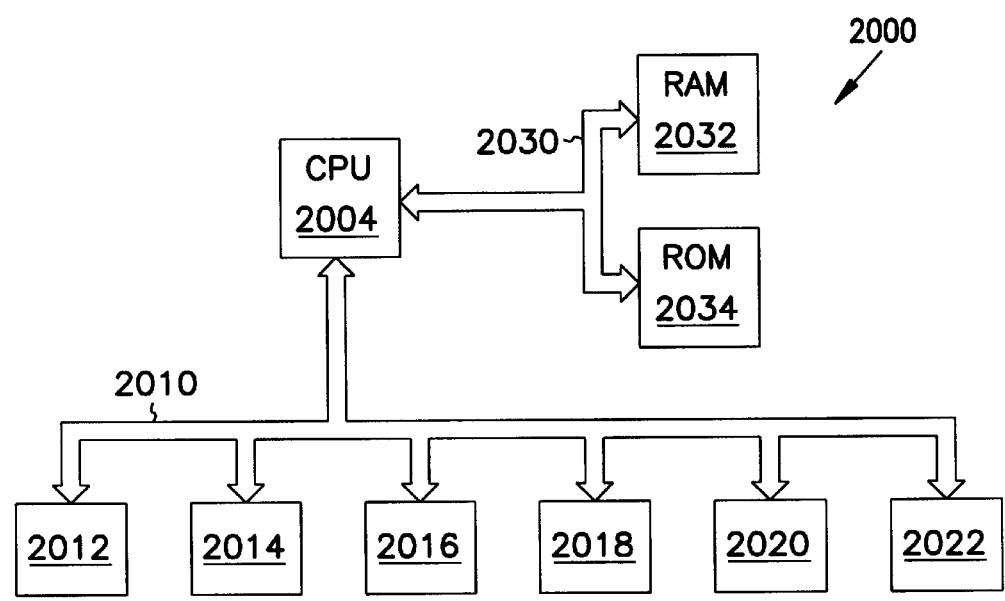
FIG. 16 is a schematic view of a computer system.

FIG. 16 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device that includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for unlatching the actuator as described above.

Conclusion

In conclusion, the invention includes a disc drive 100 having a base 112 and an actuator assembly 120 attached to the base 112. The motion and position of the actuator assembly 120 is determined by a voice coil 130, 1311 which is attached to the actuator assembly 120. A cover 114 is also attached to the base 112. The cover 114 and the base 112 form a disc enclosure. The invention also includes a temperature measuring device for indicating the temperature within the disc enclosure and outputting a signal indicating the temperature within the disc enclosure 1010. A current driver applies variable frequency current to the voice coil 130, 131 in response to the signal from the temperature measuring device. The current driver may also apply current having a variable magnitude to the voice coil 130, 131. The temperature measuring device is located within the disc enclosure. The temperature measuring device may be a thermistor. The disc drive 100 may also include a flex cable 170 having one end attached to the actuator assembly 120 and having an other end attached to electronics 180 associated with the disc drive. The temperature measuring device may be attached to the actuator assembly 120.

The current driver is adapted to apply at least two different frequencies of alternating current to the voice coil 130, 131. The current driver is programmed to attempt to unlatch the actuator assembly 120 at least two times. In some embodiments, the current driver is adapted to apply at least two different frequencies of alternating current, to attempt to unlatch the actuator assembly at least two times, and to change the frequency if at least one attempt has been unsuccessful.

A method for unlatching an actuator assembly in a disc drive includes determining an environmental element near the actuator assembly; and applying a frequency of current to the voice coil in response to the environmental element near the actuator assembly. The method may also vary the magnitude of current to the voice coil in response to the environmental element near the actuator assembly. The environmental element may be the temperature of the environment near the actuator assembly. Applying a frequency of current to the voice coil in response to the environmental element may also include categorizing the temperature into one of at least two categories. A first frequency of current may be applied to a first category of temperature and a second frequency of current may be applied to a second category of temperature. The first frequency of current may be near the resonant frequency of the actuator assembly at a first measured temperature and the second frequency of current may be near the resonant frequency of the actuator assembly at a second measured temperature. Applying a frequency of current to the voice coil in response to the environmental element may also include applying a first set of alternating currents to the actuator assembly until the actuator assembly is unlatched. The first set of alternating currents each has a frequency near the resonant frequency of the actuator assembly at a first measured temperature. A second set of alternating currents is applied to the actuator assembly until the actuator assembly is unlatched when the actuator assembly is at a second measured temperature. The second set of alternating currents each has a frequency near the resonant frequency of the actuator assembly at a second measured temperature.

The method also includes providing a first area parking band zone with a servo information. The servo information in the first area parking zone is used to determine whether the actuator assembly is unlatched. A second guard band zone may be provided on the disc. The second guard band zone may be used to monitor the position of the actuator assembly when the actuator is in the second area guard band zone and adjust the speed of the actuator based on the motion of the actuator.

The method may also determining a first resonant frequency of the actuator assembly at a first measured temperature by applying a plurality of currents having a plurality of frequencies to an actuator assembly in a first environment. The same step is repeated for a second temperature. The applying step generally includes attempting to unlatch the actuator more than one time.

Most generally a disc drive system includes an actuator, an actuator latch for holding the actuator in a latched position when engaged with the actuator, and a device for applying variable frequency current to a voice coil attached to an actuator assembly in response to a measured environmental element near the actuator assembly.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data storage device comprising:
   a data storage medium;
   a housing;
   an actuator assembly attached to the housing, the motion and position of the actuator assembly determined by a motor;
   a temperature measuring device for outputting a signal indicating the temperature within the housing; and
   a current driver which applies variable frequency current to the motor in response to the signal from the temperature measuring device.

2. The data storage device of claim 1 wherein the current driver also applies current having a variable magnitude to the motor.

3. The data storage device of claim 1 wherein the temperature measuring device is located within the housing.

4. The data storage device of claim 1 wherein the temperature measuring device is a thermistor.

5. The data storage device of claim 1 further comprising a flex cable having one end attached to the actuator assembly and having an other end attached to electronics associated with the data storage device, the temperature measuring device attached to the actuator assembly.

6. The data storage device of claim 5 wherein the temperature measuring device is a thermistor.

7. The data storage device of claim 1 wherein the current driver is adapted to apply at least two different frequencies of alternating current to the motor.

8. The data storage device of claim 1 wherein the current driver is adapted to attempt to unlatch the actuator assembly at least two times.

9. The data storage device of claim 1 wherein the current driver is adapted to apply at least two different frequencies of alternating current, and further adapted to attempt to unlatch the actuator assembly at least two times, and still further adapted to change the frequency if at least one attempt has been unsuccessful.

10. The data storage device of claim 1, in which the storage medium comprises at least one rotating disc.

11. The data storage device of claim 1, in which the storage medium comprises a magnetic medium.

12. The data storage device of claim 1, in which the motor comprises a voice coil.

13. The data storage device of claim 12, in which the voice coil is carried by the actuator.

14. A method for unlatching an actuator assembly in a disc drive including a base to which the actuator assembly is attached, an actuator latch for holding the actuator assembly in a latched position, a voice coil attached to the actuator assembly which determines the motion and position of the actuator assembly, and a disc rotatably attached to the base, the method comprising the steps of:

(a) determining an environmental element near the actuator assembly; and (b) applying a frequency of current to the voice coil in response to the environmental element near the actuator assembly.

15. The method of claim 14 further comprising the step of (c) varying a magnitude of current to the voice coil in response to the environmental element near the actuator assembly.

16. The method of claim 14 wherein the environmental element is the temperature of the environment near the actuator assembly.

17. The method of claim 16 wherein the applying step (b) further comprises (b)(i) categorizing the temperature into one of at least two categories wherein a first frequency of current is applied to a first category of temperature and a second frequency of current is applied to a second category of temperature.

18. The method of claim 16 wherein the applying step (b) further comprises the steps of:

(b)(i) applying a first frequency of current which is near the resonant frequency of the actuator assembly at a first measured temperature; and (b)(ii) applying a second frequency of current which is near the resonant frequency of the actuator assembly at a second measured temperature.

19. The method of claim 16 wherein the applying step (b) further comprises the steps of:

(b)(i) applying a first plurality of alternating currents to the actuator assembly until the actuator assembly is unlatched, the first plurality of alternating currents each having a frequency near the resonant frequency of the actuator assembly at a first measured temperature; and (b)(ii) applying a second plurality of alternating currents to the actuator assembly until the actuator assembly is unlatched, the second plurality of alternating currents each having a frequency near the resonant frequency of the actuator assembly at a second measured temperature.

20. The method of claim 19 further comprising the step of (d) providing a first area parking band zone with a servo information used to determine whether the actuator assembly is unlatched.

21. The method of claim 20 wherein the applying step (b) further comprises the steps of:

(e) providing a second guard band zone on the disc and monitoring the position of the actuator assembly when the actuator is in the second area guard band zone; and (f) adjusting the speed of the actuator based on the motion of the actuator.

22. The method of claim 20 wherein the applying step (b) comprises attempting to unlatch the actuator more than one time.

23. The method of claim 16 wherein the applying step (b) further comprises the steps of:

(b)(i) determining a first resonant frequency of the actuator assembly at a first measured temperature by applying a plurality of currents having a plurality of frequencies to an actuator assembly in a first environment; and (b)(ii) determining a second resonant of the actuator assembly at a first measured temperature by applying a plurality of currents having a plurality of frequencies to an actuator assembly in a first environment.

* * * * *